April 14, 1964 S. TARANTUR 3,129,283

TELEVISION TUNING INDICATOR

Filed July 30, 1958 4 Sheets-Sheet 1

INVENTOR.
Sam Tarantur
BY Donald W. Phillion
HIS ATTORNEY

April 14, 1964 S. TARANTUR 3,129,283

TELEVISION TUNING INDICATOR

Filed July 30, 1958 4 Sheets-Sheet 2

INVENTOR.
Sam Tarantur
BY Donald W. Phillion
HIS ATTORNEY

April 14, 1964 S. TARANTUR 3,129,283

TELEVISION TUNING INDICATOR

Filed July 30, 1958 4 Sheets-Sheet 3

INVENTOR.
Sam Tarantur
BY Donald W. Phillion
HIS ATTORNEY

April 14, 1964 S. TARANTUR 3,129,283

TELEVISION TUNING INDICATOR

Filed July 30, 1958 4 Sheets-Sheet 4

INVENTOR.
Sam Tarantur
BY Donald W. Phillion
HIS ATTORNEY

United States Patent Office
3,129,283
Patented Apr. 14, 1964

3,129,283
TELEVISION TUNING INDICATOR
Sam Tarantur, River Grove, Ill., assignor to Admiral Corporation, Chicago, Ill., a corporation of Delaware
Filed July 30, 1958, Ser. No. 752,134
4 Claims. (Cl. 178—5.4)

This invention relates, generally, to means for tuning a television receiver, and more specifically to means for visually indicating to the operator when the television receiver is tuned properly.

In the prior art, "tuning eyes" have been employed to indicate visually when a receiver is tuned properly. In general, "tuning eyes" are tubes which function to respond to the received signal to produce within the "tuning eye" tube an incandescence which is visible to the operator, and which has an area configuration variable in accordance with the degree of tuning. By simply observing the incandescent area of the "tuning eye" the operator can tune the receiver with considerable accuracy. Such tuning eyes have been employed largely with radios and have been arranged to be responsive to a peaked circuit. Because of the much broader bandwidths employed in a television channel, it is not practical to employ the same approach as is employed with radio receivers.

Most present-day television receivers, however, employ intercarrier sound systems in which the intercarrier sound signal has a nominal carrier frequency of 4.5 megacycles. Such sound signal is produced by the beating together of the nominal intermediate frequency (IF) video carrier signal and the nominal IF sound carrier signal. In such receivers the frequency response characteristic at the output of the intermediate frequency stages exhibits a large response over the video bandwidth and a null over the sound bandwidth. Detuning either above or below the proper sound carrier frequency will result in an increase in sound response. It will be apparent that when the receiver is tuned properly the amplitude of the 4.5 megacycle intercarrier sound signal will be at a minimum. This minimum amplitude, or null, can be employed to energize means for indicating proper tuning of a television receiver. More specifically, for example, such a null can be employed to control the brightness of the picture tube as an indication of the degree of accuracy of tuning.

An object of the present invention is to employ the null of the sound carrier signal to provide means for visually indicating when a television receiver is tuned properly.

A further object of the invention is to provide an inexpensive and reliable means for indicating visually the proper tuning of a television receiver.

A third object of the invention is to provide means for indicating by the brightness of the picture tube the proper tuning of a television receiver.

A fourth aim of the invention is the improvement of tuning means, generally.

In accordance with the invention, there is provided a television receiver employing an intercarrier sound system, means for producing the intercarrier sound signal, means for amplifying the intercarrier sound signal, means for detecting the output signal of the amplifying means, and means constructed to respond to the output signal of the detector means to vary the brightness of the television receiver picture tube inversely as the magnitude of the output of the detector means.

In accordance with other forms of the invention, the output signal of the detector means can be employed to energize other visual indicating means, such as a "tuning eye," for example.

These and other objects and features of the invention will be understood more fully from the following detailed description thereof, when read in conjunction with the drawings, in which.

It is to be noted that the corresponding elements in the various figures herein are represented by the same reference characters (although primed in varying degrees).

Figure 1:
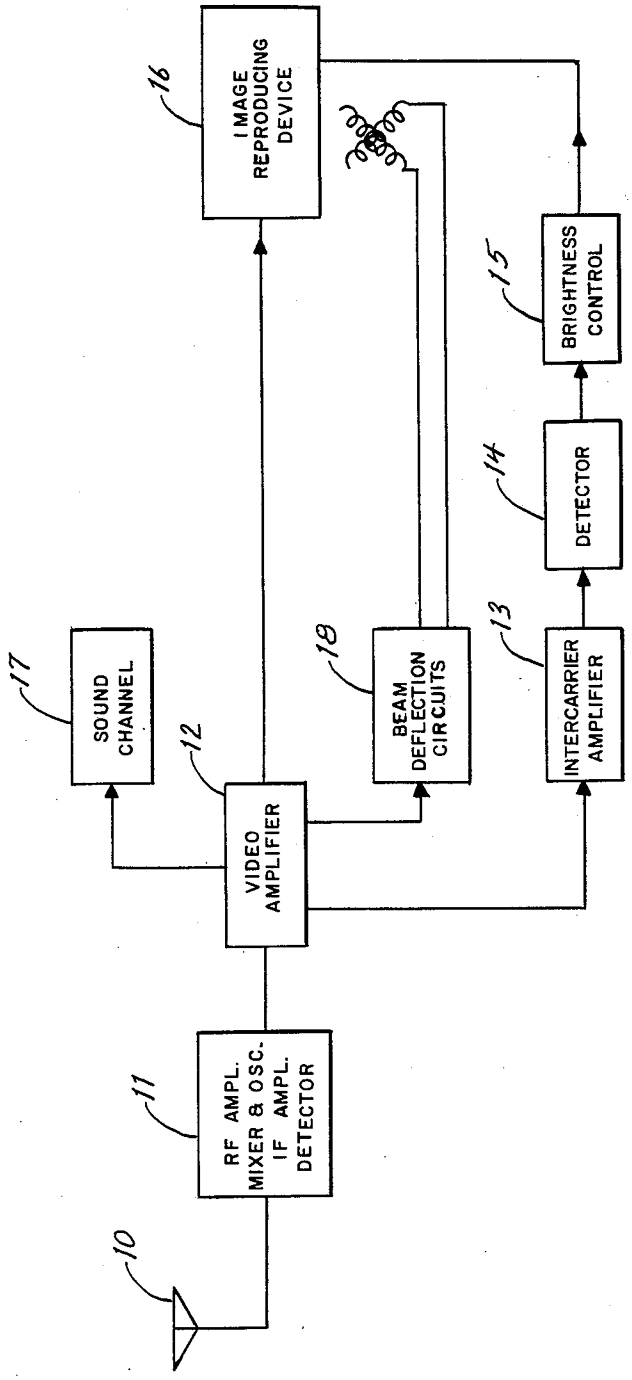
FIG. 1 is a block diagram of the invention.
Figure 4:
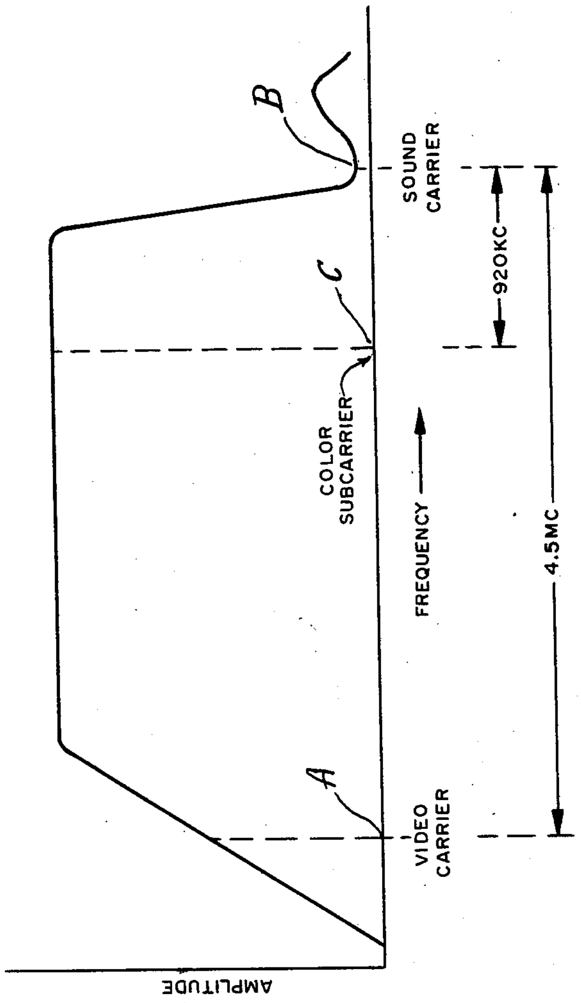
FIG. 4 is a typical frequency response curve of a television receiver and is applicable to the circuits of both FIG. 2 and FIG. 3.

Referring now to FIG. 1, the transmitted signal is intercepted by the antenna 10, from whence it is supplied to the radio frequency amplifier contained in the block 11. In a well-known manner the mixer circuit, the local oscillator, the intermediate frequency stages and the second detector, all included in block 11, function to produce a signal containing the composite video signal and also the sound signal which has a nominal carrier frequency of 4.5 megacycles. The last-mentioned frequency is determined by the difference between the nominal video carrier frequency and the nominal sound carrier frequency. A typical frequency response characteristic of the receiver, as it appears at the output of the intermediate amplifier stages, is shown by the curve of FIG. 4. It will be observed from examination of this curve that the nominal video carrier frequency (point A) and the nominal sound carrier frequency (point B) are 4.5 megacycles apart, and that the nominal sound carrier frequency (point B) is located in an amplitude null in the curve.

The intercarrier amplifier 13, the detector 14, and the brightness control 15 function to produce a D.-C. voltage whose magnitude varies with the amplitude of the intercarrier sound signal. This D.-C. voltage is applied across the cathode-control grid gap of the picture tube included in the image reproducing device 16 in the proper polarity to produce the brightest picture when the receiver is tuned properly. The sound channel 17 and the beam deflection circuits 18 can be standard circuits.

Figure 2:
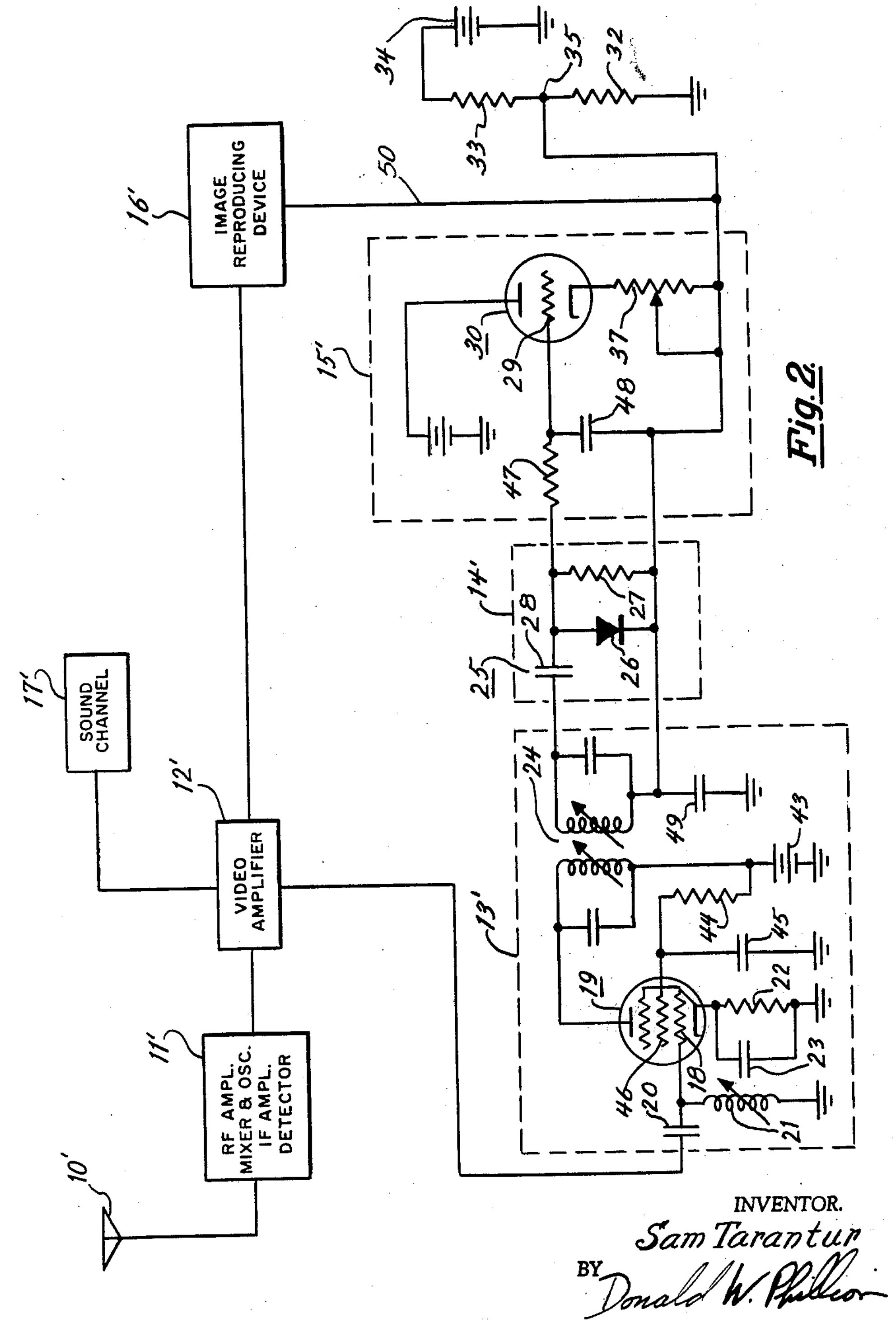
FIG. 2 is a combined block diagram and schematic diagram of a specific form of the invention.

Referring now to FIG. 2, there is shown the schematic diagrams of the circuits contained within the blocks 13, 14, and 15. The composite video signal and the audio carrying frequency modulated 4.5 megacycle signal are supplied to the control grid 18 of the amplifier tube 19 through the band-pass filter circuit comprising capacitor 20 and variable inductor 21, which filter functions to remove the composite video signal. The bias for grid 18 is obtained by means of cathode resistor 22, which is shunted by R-F by-pass capacitor 23. The output signal of the tube 19 is supplied to the double-tuned circuit 24, which is tuned to 4.5 megacycles. Battery source 43 functions to provide plate voltage for tube 19 and also to provide voltage for screen grid 46 through a circuit comprising resistor 44 and R-F by-pass capacitor 45. The detector 14′, which comprises capacitor 25, diode 26, and resistor 27, is responsive to the output signal of the secondary of the double-tuned circuit 24 to produce a D.-C. voltage whose magnitude varies as the magnitude of the 4.5 megacycle intercarrier signal.

It will be noted that when the receiver is tuned properly so that the intercarrier signal is at the null (point B in FIG. 4) the negative D.-C. voltage accumulated on plate 28 of the capacitor 25 will be at a minimum value. Consequently, the negative D.-C. bias voltage applied to the control grid 29 of tube 30 through coupling resistor 47 will be at a minimum. Other parameters of tube 30 are arranged so that under the condition of minimum grid bias mentioned above, the tube 30 will be conductive. Capacitors 48 and 49 are R-F by-pass capacitors.

The function of the tube 30 will now be described in detail. Generally speaking, the tube 30 functions as a variable impedance in series with the resistor 32, which together with resistor 33 forms a voltage divider for the voltage source 34. As the impedance of the tube 30 changes, the current flow therethrough and through the resistor 32 will vary, thus causing variation of the potential of the point 35. More specifically, as the negative bias on the control grid 29 increases, the impedance of the tube 30 will increase, the current flow through the resistor 32 will decrease, and the potential of the point 35 will decrease. Since the point 35 is connected through the lead 50 to the grid of the picture tube (not specifically shown but contained in the block 16′), the said picture tube will become less bright. Conversely, if the charge accumulated on the plate 28 of the capacitor 25 become less negative (due to more accurate tuning of the receiver, i.e., due to tuning the intercarrier sound signal more accurately into the null) the potential of the point 35 will be increased, thus increasing the brightness of the picture tube.

The function of the battery source 34 and the voltage divider, comprising resistors 33 and 32, is to establish at the point 35 a potential which, when added to the potential drop produced across resistor 32 by the common current flow through resistor 32 and tube 30, will result in a potential of the proper magnitude to control the brightness of the picture tube.

The potentiometer comprising the resistor 37 functions as a conventional brightness control manually operable by the operator. More specifically, as the magnitude of the resistor 37 is decreased, the grid bias becomes less and the potential of the point 35 becomes greater, thus increasing the brightness of the picture tube. It is to be noted that the brightness determined by the setting of the resistor 37 is unrelated to the tuning of the television receiver, whereas the D.-C. voltage supplied to the grid 29 of tube 30 from the detector 14 is a direct product of tuning.

The system described above can also be employed with color television receivers, in which the nominal video carrier frequency and the nominal sound carrier frequency are separated by 4.5 megacycles. Alternatively, in color receivers the color sub-carrier may be employed in lieu of the video carrier. The position of the color nominal sub-carrier frequency in the frequency spectrum of a color television channel is shown in FIG. 4 at point C. The circuitry for utilizing the color sub-carrier in the present invention can be similar to the circuitry shown in FIG. 2, except that the band-pass amplifier 13′ should be constructed to pass the 920 kc. beat frequency signal resulting from the beating together of the sound carrier and the color sub-carrier signals.

Figure 3:
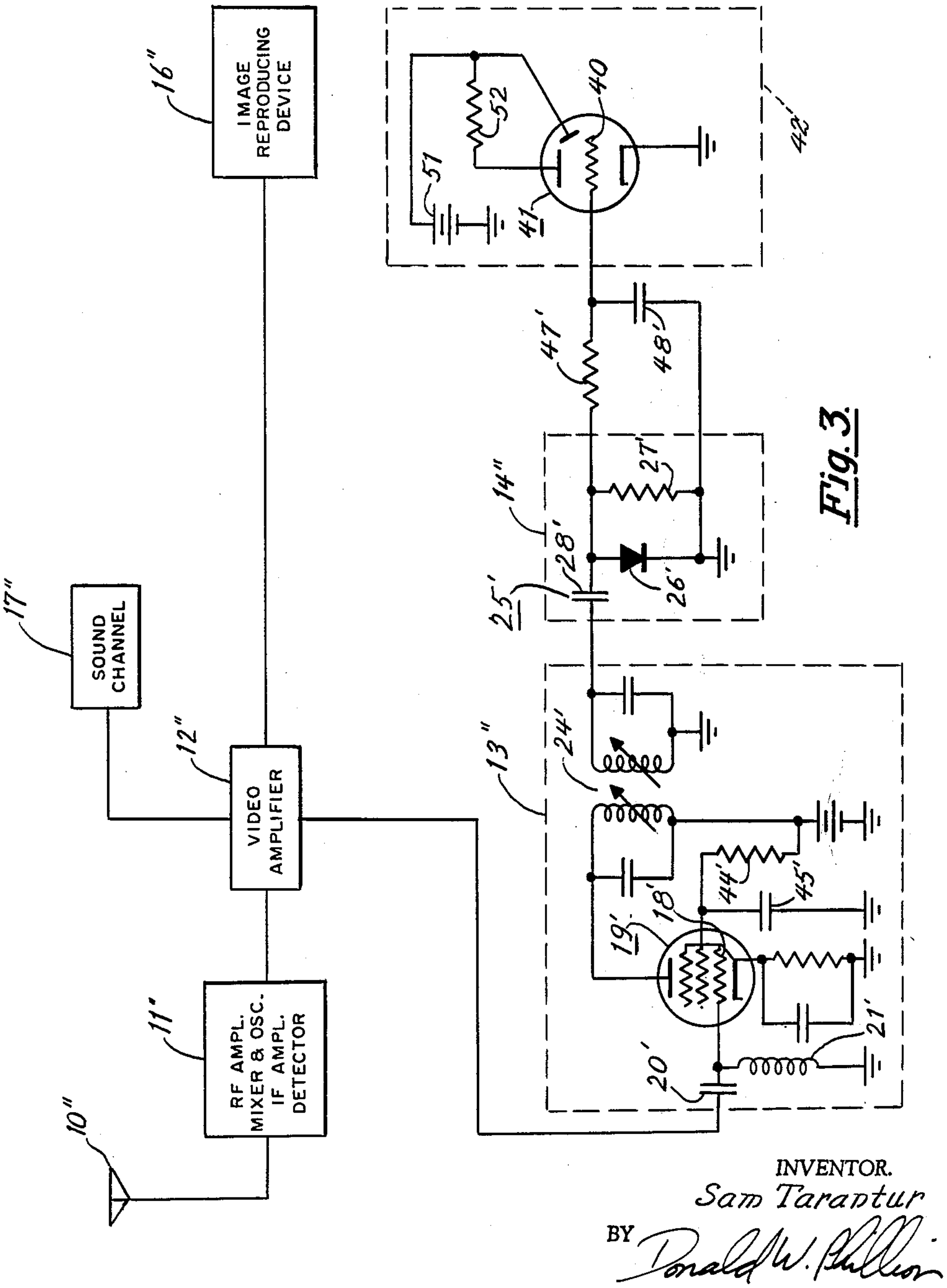
FIG. 3 is a combined block diagram and schematic form of another embodiment of the invention.

Referring now to FIG. 3, there is shown another embodiment of the invention, employing a "tuning eye" tube 41 rather than the brightness of the picture tube to indicate proper tuning of the receiver. The operation of of the circuit shown in FIG. 3 is substantially the same as the operation of the circuit shown in FIG. 2, with the exception of the circuitry shown in the block 42. As indicated hereinbefore, when the television receiver is tuned properly the negative voltage appearing at the plate 28′ of the capacitor 25′ is at a minimum, so that the "tuning eye" tube 41 will indicate visually such proper tuning. The "tuning eye" tube 40 may be a 6E5 type tube, also known as a "Magic Eye." Battery source 51 supplies plate voltage to the tube 41 through plate load resistor 52.

It is to be noted that the invention described herein can be employed in any system which has at least one carrier signal and another reference signal whose frequency is removed from the carrier frequency by a constant amount and which is tuned properly when either the carrier signal or the reference signal is at either a node or a null. It is apparent from the foregoing statement that many changes may be made in the circuits described, and various applications may be made thereof without departing from the spirit or scope of the invention.

I claim:

1. In a television receiver comprising circuit means for reproducing a composite video signal and a picture tube device including a cathode and a control grid and employing an intercarrier sound system of the type in which the frequency response curve at the output of said circuit means is characterized by a response of a large magnitude with respect to the video signal and a null with respect to the sound signal, means for selectively responding to the intercarrier sound signal to produce a D.-C. signal whose magnitude is proportional to the magnitude of said intercarrier signal, and means for supplying said D.-C. signal across the cathode and control grid of said picture tube to produce the brightest picture when the magnitude of said intercarrier sound signal is at its null point.

2. In a television receiver comprising intermediate frequency stages, a video detector, and a picture tube including a cathode and a control grid, and employing an intercarrier sound system in which the intercarrier sound signal appears at the output of said video detector and in which the frequency response curve at the output of the video detector is characterized by a response of a large magnitude with respect to video signals and a null with respect to sound signals, bandpass amplifier means coupled to said video detector for amplifying the intercarrier sound signal, detector means responsive to the output signal of said band-pass amplifier means to produce a D.-C. signal whose magnitude is proportional to the average strength of said intercarrier sound signal, and means for supplying said D.-C. signal across the cathode and control grid of said picture tube to produce the brightest picture therein when the magnitude of said intercarrier sound signal is at its null point.

3. In a color television receiver comprising intermediate frequency stages, video detector means, and a picture tube including a cathode and a control grid, and employing an intercarrier sound system of the type in which the frequency response curve at the output of the video detector is characterized by a response of a large magnitude with respect to the color subcarrier signal and a null with respect to the sound carrying signal, bandpass amplifier means responsive to the output of said video detector for selectively amplifying the signal produced by the mixing of said sound carrying signal and said color subcarrier signal, detector means responsive to the output signal of said amplifier to produce a D.-C. signal whose magnitude is proportional to the magnitude of said intercarrier sound signal, and means for supplying said D.-C. signal across the cathode and control grid of said picture tube to produce the brightest picture when the magnitude of said intercarrier sound signal is at its null point.

4. In a television receiver having an intercarrier sound system and means for producing the intercarrier sound signal, said receiver having a response such that said intercarrier sound signal has a minimum amplitude when said receiver is tuned for best picture reception, means for indicating proper tuning of said receiver by the brightness of the image displayed on the screen of the cathode ray tube comprising: amplifying means for amplifying said intercarrier sound signal; detecting means coupled to said amplifying means for deriving a direct current voltage representative of the amplitude of said intercarrier sound signal; an electron discharge device having an input circuit and an output circuit, said detecting means being connected to said input circuit and setting the bias level of said electron discharge device in accordance with said derived direct current voltage; a voltage divider energized from a constant voltage source, a portion of said voltage divider connected in said output circuit of said discharge device and across the control elements of said cathode ray tube for controlling the brightness level thereof, whereby the brightness level of said cathode ray tube is varied as a function of said derived direct current voltage.

References Cited in the file of this patent

UNITED STATES PATENTS

| | | |
|---|---|---|
| 2,696,521 | Parker | Dec. 7, 1954 |
| 2,750,441 | Schlesinger | June 12, 1956 |
| 2,819,334 | Squires | Jan. 7, 1958 |
| 2,912,490 | Parker | Nov. 10, 1959 |
| 2,943,145 | Parker | June 28, 1960 |